May 22, 1934.  A. J. HIXON ET AL  1,960,153
COMBINATION CABLE SUPPORT AND CABLE CONNECTER
Filed July 28, 1933    3 Sheets-Sheet 1
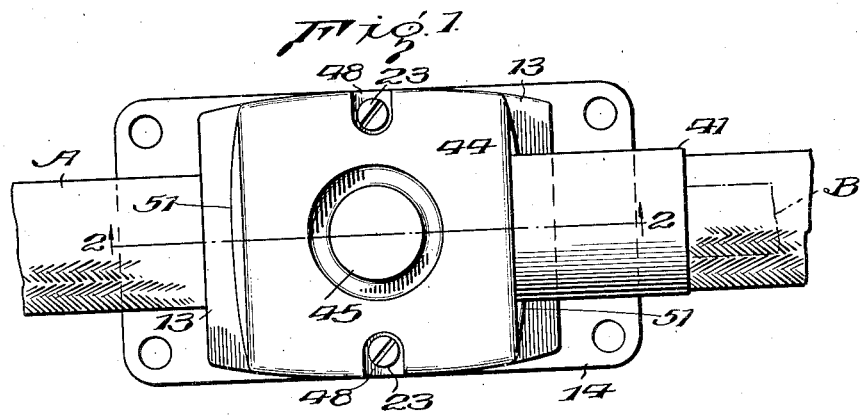
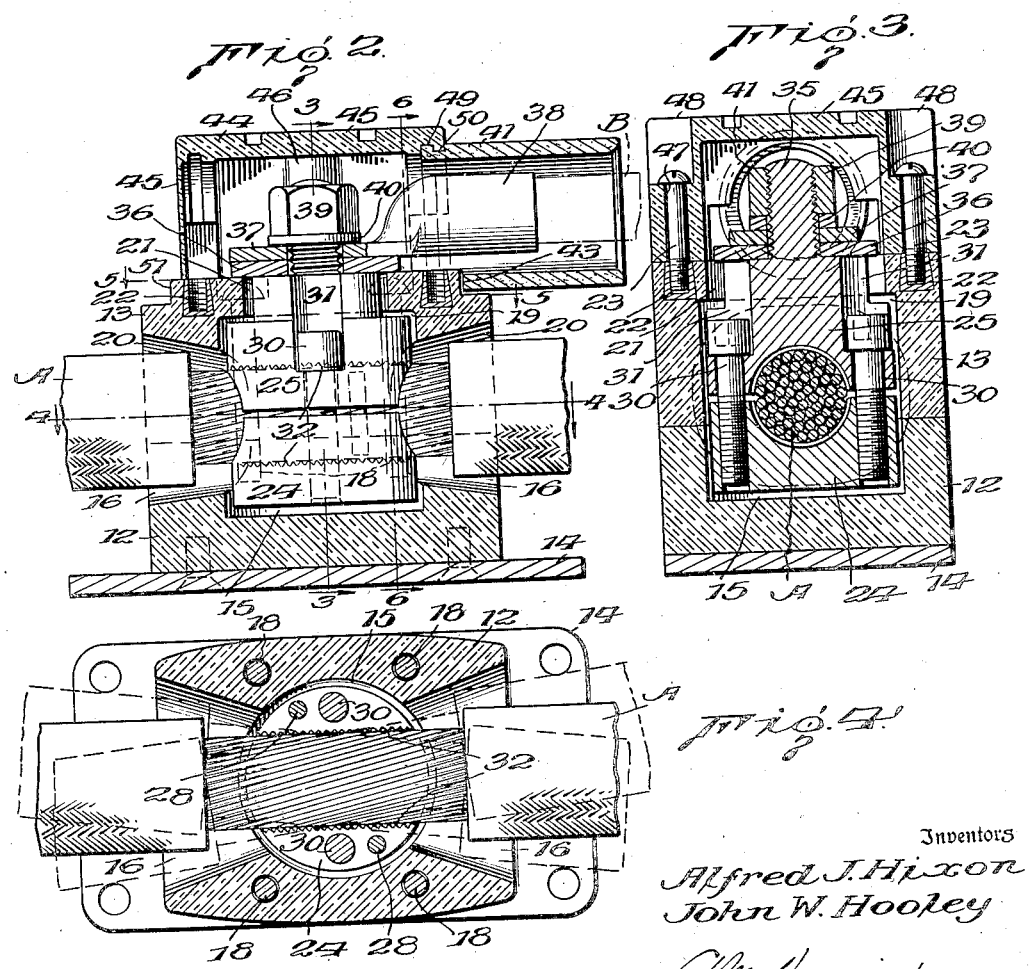
Inventors
Alfred J. Hixon
John W. Hooley
By  Attorney

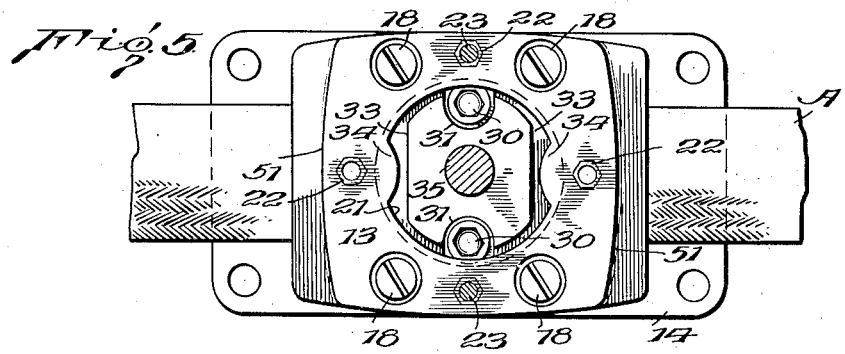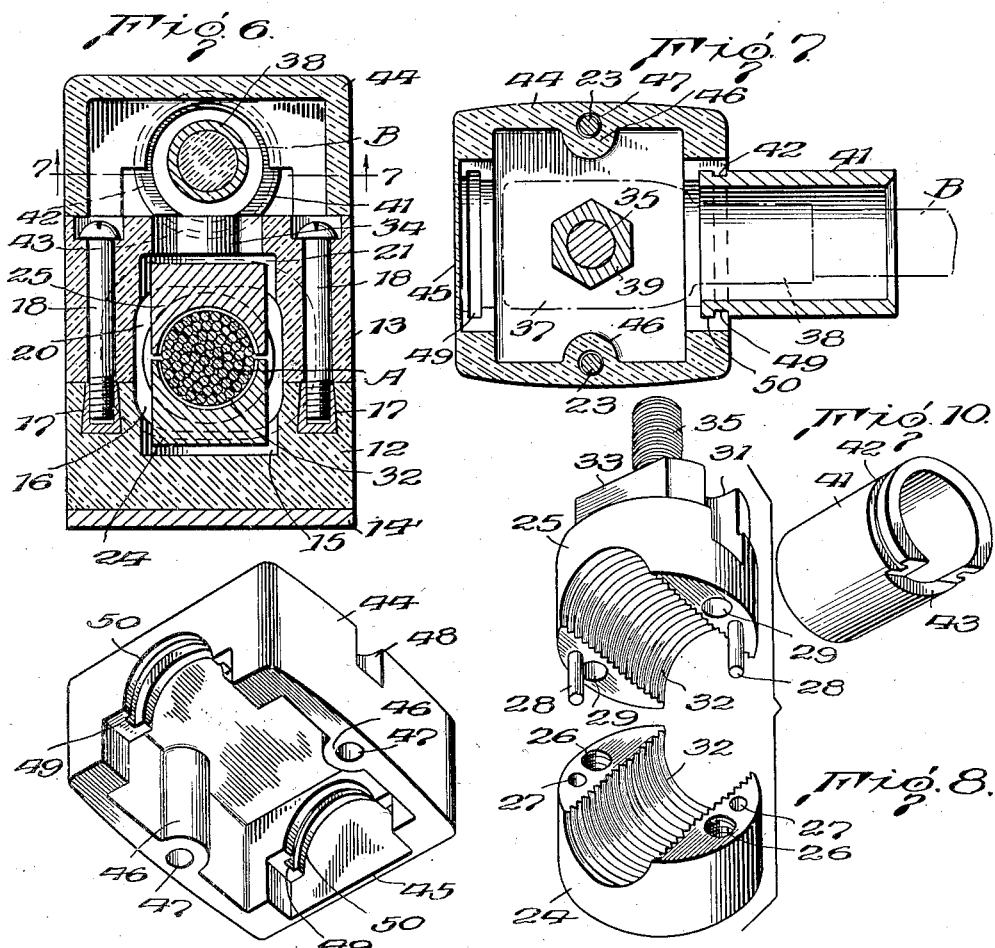

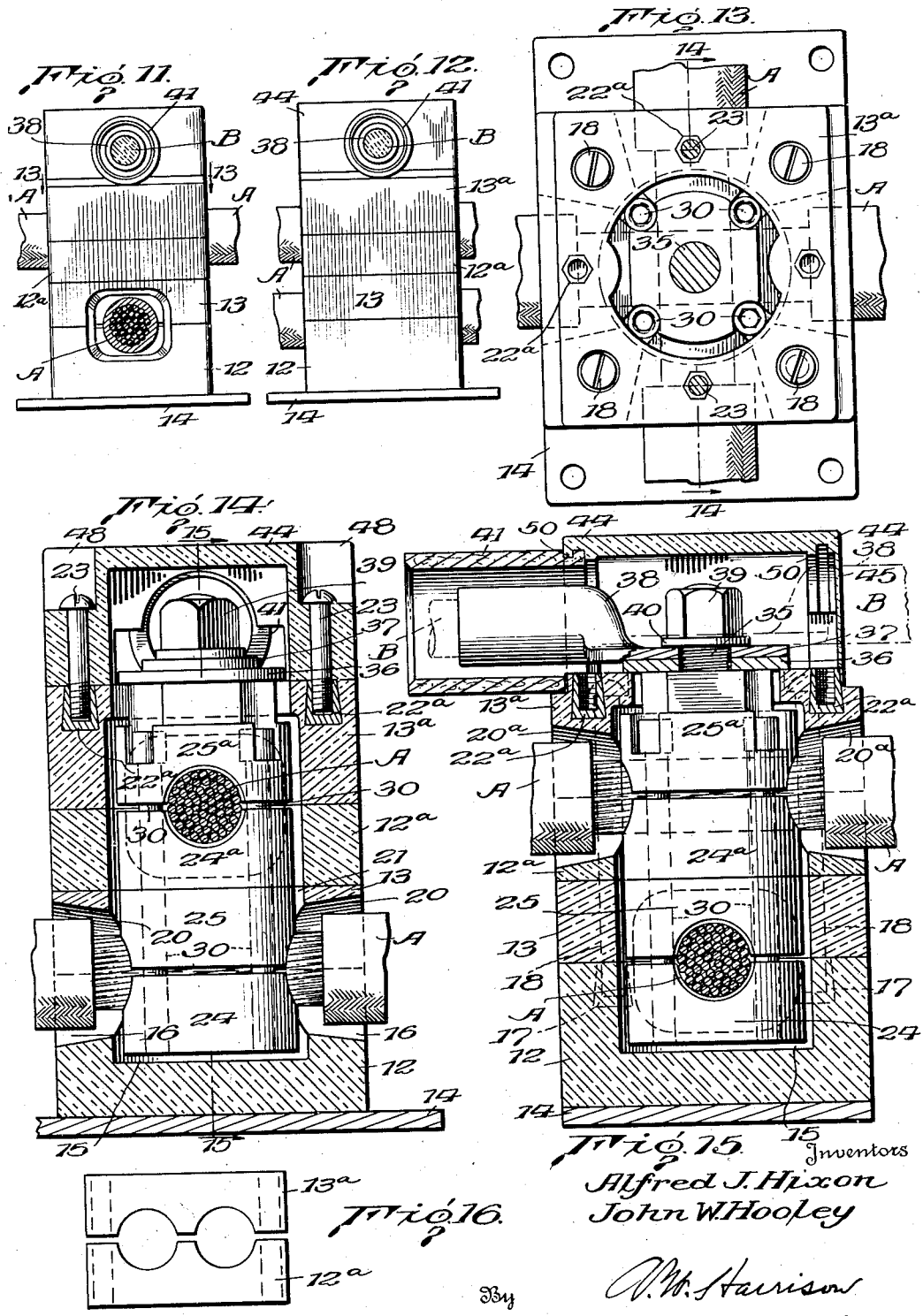

Patented May 22, 1934

1,960,153

UNITED STATES PATENT OFFICE 1,960,153

COMBINATION CABLE SUPPORT AND CABLE CONNECTER

Alfred J. Hixon, Braintree, Mass., and John W. Hooley, Larchmont, N. Y., assignors to Hixley Electric Company, New York, N. Y., a corporation of New York Application July 28, 1933, Serial No. 682,694

15 Claims. (Cl. 247—8)

This invention relates to devices or mechanisms for supporting electric cables in installed positions, and has particular reference to such devices which provide for gripping bared portions of the cables and include circuit connections such as bus bars.

It is customary for electrical engineers, manufacturers and underwriters to limit the number of conductors in conduits and until they enter a panel or connection box, or so-called pull box or junction box. It has been difficult to so anchor the cables as to properly sustain them and prevent the weight of the cables, or vibrations of the building in which they are installed, or other forces from effecting such strain as to pull the cables out of position or interrupt the proper contacts with, or through, the necessary circuit completing members.

One of the objects of our present invention is to provide an improved cable support which will permit the gripped cable to swing without interfering with the required circuit.

Another object is to provide a cable support and connecter having means whereby an electrical extension connection can be readily effected in either one of a plurality of directions such as five.

Another object is to provide a cable support and connecter capable of supporting, connecting, and tapping a plurality of main cables with one or more tap cables.

Another object is to provide a cable support and connecter the members of which are mounted in a casing of "bakelite" or other insulating material, the members of the casing being connected by screws the threaded ends of which engage internally threaded metal inserts, the advantages of which will be explained.

With the above-stated objects in view, and others hereinafter explained, the invention consists in the construction and combinations of parts substantially as hereinafter described.

Of the accompanying drawings:

Figure 1 is a plan view of the complete combination.

Figure 2 represents a section on line 2—2 of Figure 1.

Figure 3 represents a section on line 3—3 of Figure 2.

Figure 4 represents a section on line 4—4 of Figure 2.

Figure 5 is a plan view of the parts below the line 5—5 of Figure 2.

Figure 6 represents a section on line 6—6 of Figure 2.

Figure 7 represents a section on line 7—7 of Figure 6.

Figure 8 is a perspective view of the two members of the cable clamp.

Figure 9 is a perspective view of the cap or cover member.

Figure 10 is a perspective view of the protector for the extended portion of the bus bar connection or lug.

Figures 11 and 12 are side elevations of structures which provide for supporting, connecting, and tapping a plurality of main cables.

Figure 13 represents a section on line 13—13 of Figure 11 on a larger scale.

Figure 14 represents a section on line 14—14 of Figure 13.

Figure 15 represents a section on line 15—15 of Figure 14.

Figure 16 is a somewhat diagrammatic view of a portion of a similar structure providing for gripping a pair of cables side by side.

Similar reference characters denote similar parts or features in all of the figures.

Referring first to Figures 1 to 6, the casing for the cable-gripping members comprises lower and upper members 12, 13, of "bakelite" or other suitable insulating material, the lower member 12 having a plate 14 secured to it as by screws indicated by dotted lines in Figure 2, said plate having suitable holes whereby it, and the entire combination, may be secured in such location as may be desired for it, as for instance, the cable support illustrated in Letters Patent No. 1,838,516 issued December 29, 1931. The said lower member 12 has a central recess 15 from which openings 16 extend in opposite directions, said openings being trough-shaped and the walls thereof diverging as best shown in Figures 2 and 4, for a purpose presently explained. And mounted in the upper surface of said member 12 are four metal inserts 17 internally threaded for four screws 18 (Figs. 4, 5 and 6) which hold the members 12 and 13 together.

The upper member 13 of the casing has a central recess 19 from which openings 20 extend in opposite directions, said openings being trough-shaped and the walls thereof diverging (Fig. 2), said recess 19 and the openings 20 corresponding in shape with the recess 15 and openings 16 of the lower member 12 to provide a space or chamber for the cable-gripping clamp members presently described, and permit swinging of the gripped or clamped cable A. The upper member 13 is also formed with an opening 21 in its top, extending up from its recess 19.

Mounted in the upper surface of the member 13 are four metal inserts 22 internally threaded for the screws 23 which hold the cap or cover member presently described secured in either one of different mountings as will be explained.

Before describing the cap or cover member in detail, the cable clamp illustrated in detail, in Figure 8, will be described. It consists of lower and upper members 24, 25, each cylindrical in form and made of brass, copper, gun-metal or other suitable conducting metal. The lower member 24 has two threaded sockets 26 and adjacent thereto has two smooth sockets 27. The upper member 25 has two rigid pins 28 to slidingly fit the sockets 27 of the lower member, and adjacent thereto has apertures 29 which, when the two members are assembled, with the pins 28 in the sockets 27, are in alinement with the threaded sockets 26, for screws 30 (Figs. 2, 3 and 4) the heads of which are accessible by a screw driver inserted through the recesses 31 in the opposite sides of the upper portion of the member 25, when the bared portion of a cable A is to be gripped between the two members 24, 25.

Each member 24, 25, has a transverse serrated groove 32 so that when the two members are adjusted closely together by the screws 30, to engage upper and lower bared areas of a cable, the cable will be effectively gripped along and over a large area of the cable. Further advantages of this structure will be explained hereinafter.

It should be explained here, that the structure of our invention enables cables of different sizes to be equally well gripped, by substituting for such clamp members as those illustrated, others having grooves 32 shaped to fit the cable that is to be gripped and supported thereby.

The upper portion of the clamp member 25 has straight sides 33 (Figs. 5 and 8) which coact with inwardly extending curved lugs 34 of the casing member 13 to limit the extent to which the cable-gripping members can turn either way in the casing.

Integral with and rising from the center of the upper clamp member 25 is a screw threaded stud 35, over which is fitted a large metal washer 36 to provide ample contact with the flat portion 37 of the bus bar connection 38, said flat portion 37 having an aperture for the stud 35. By means of a nut 39 and an interposed washer 40, the bus bar connection is secured in electrical circuit contact with the cable-gripping members. The outer portion of the connection member 38 is illustrated as cylindrical to receive the end of a tap or round bus bar B. Said outer portion however might be flat or otherwise shaped to receive a bus bar that is not round.

To protect the point of junction between the bus bar and the connection thereof with the parts inside the casing, we provide a cylinder 41 of "bakelite," fibre, or other suitable insulating material, said cylinder having a groove 42 adjacent to one end, a portion of the same end being cut away to present a shoulder 43 (Fig. 10). The purpose of said groove and shoulder will be presently explained.

The cap or cover member 44, of "bakelite" or other suitable insulating material, is secured to the top of the casing member 13 by the screws 23 hereinbefore referred to. There are two of the screws 23 while there are four of the threaded inserts 22 (Fig. 5). This is to enable the cap or cover member to be secured in either one of four positions, by so turning it, before securing, that the two screws may engage the inserts as illustrated in Figure 5, or may engage those two inserts which, in said figure, are illustrated as unoccupied.

When the cover member is made, it has three "knockout" areas 45 two of which are in opposite side walls of the said cover, and one in its top. In Figures 2, 7 and 9, however, only one of the side-wall knock-outs is illustrated because the other side-wall knock-out has been removed to provide for complete assembly including the protector 41 and the bus bar connection located therein. If it should be desired to effect any connection in a direction opposite the one illustrated, then both of the side wall knock-outs may be removed. And if the connection is to be made only upwardly, then the knock-out in the top of the cover member will be removed and a properly shaped bus bar connection provided to extend through the resulting opening.

Two of the side walls of the cap or cover have inwardly thickened portions or ribs 46 (Figs. 7 and 9) in which are apertures 47 for the passage of the screws 23 which hold the said cover in fixed position, and the said walls have outwardly exposed recesses 48 (Figs. 3 and 9) for permitting access to the heads of said screws. Each of the two other side walls of the cover has an arched rim formed with a groove 49 and rib 50 to cooperate or interlock with the correspondingly proportioned rib and groove of the inner end of the protector 41 (Fig. 2). When these members are so interengaged or interlocked, the shoulder 43 of the protector 41 is located opposite a side shoulder portion 51 of the upper casing member 13. The cut-away portion of the protector (Fig. 10) enables the inner end of said protector to reach far enough under an arched portion of a wall of the cover member to effect proper interengagement of the grooves and ribs referred to and as illustrated in Figures 2 and 7.

The method of mounting a cable in our improved support and connecter, and the particular features of novelty and the advantages thereof, will now be explained.

Assuming that one of the complete assemblages such as illustrated in Figures 1 and 2, but lacking a cable, has been installed ready for use, in a cabinet of such type as illustrated in Letters Patent No. 1,838,516, as by welding, or by screws, to the rear wall of the cabinet, or has been installed elsewhere ready for use, the following parts are first removed in order to prepare for the installation of the cable from which the insulation has been removed to bare the wires for the requisite distance.

The screws 23 are first removed, and the cap or cover 44 and the extension protector 41 are separated from place. This exposes the following parts which are successively removed, viz., the nut 39, the lock washer 40, the bus bar connection 37, 38, and the large conducting washer 36. At the same time it exposes to access the heads of the screws 18 and 30 which are then removed, resulting in freeing the upper casing member 13 from the lower casing member and freeing the clamp members 24, 25, from each other. Said freed members are then removed to provide for the installation of a cable.

The two clamp members 24, 25, are then assembled with the bared portion of a cable A gripped by the serrated grooves of said clamp members, and the screws 30 re-set to cause said serrated grooves to bite firmly into the bared wires in the cable. Then the cable and its two gripping clamp members are laid in the exposed center recess 15 of the casing member 12 and in the diverging openings leading therefrom, and the other parts which have been removed are restored to their operative positions in an order practically the reverse of the order which has been described relative to their separation and removal.

Since all of the screws referred to are located with their heads accessible through recessed portions of the members of insulating material in which they are mounted, the combination as a whole is so compact, with no side protuberances, that it can be mounted in an installed position where space for it is limited. The metal inserts 17 and 22 which are internally threaded, facilitate this structure since the threads of such screws as those illustrated at 18 and 23 could not durably engage such material as "bakelite." Therefore the said metal inserts 17 and 22 are molded in the members 12 and 13 and are so shaped (Figs. 6 and 3) as to be locked therein and furnish a reliably permanent connection for the screws.

When the parts are re-assembled, with a cable in gripped condition, if it be desired to have the bus bar connection 38 extend laterally, either side, instead of in line with the cable as illustrated, it is only necessary to turn the cover member 44 and have its screws 23 engage the two inserts 22 which are illustrated as vacant in Figure 2 instead of engaging the ones which are shown in said figure as occupied by said screws. This enables the bus bar connection to be set or fixed extending in either one of four directions. If an upward connection is desired, the central top portion 45 of the cover member can be knocked out, and a connection 38 having a bent foot piece 37 substituted for the one illustrated, thus providing for a selection of either one of five directions in which the bus bar connection may extend. If two such connections as the one illustrated are desired, then the knock-out 45 illustrated at the left in Figure 2 can also be removed.

When the members have been completely assembled and installed, the cable and the parts which coact therewith to grip it are free to swing considerably. The reason why this is an advantage is that cables are of flexible construction and, when installed in a building structure and secured therein, are liable to be affected directly by movements of the structure caused by wind strain, stress or bending movements. Without such flexibility of movement of the cable and its gripping clamp and the metal conducting connections including the large washer member 36 such movements of the building structure would be liable to impose increased strain on the cable support and connections both electrically and mechanically and ultimately set up a creeping or loosening effect on the entire structure.

The grooves 32 in the cable clamp members 24, 25, have been referred to as serrated. We do not limit ourselves to the form of serrations illustrated, since said term is intended to apply to any surface of said grooves other than smooth. The reason for this is to reduce liability of oxidizing, which frequently results from changes in temperature that produce a breathing effect between the bared wires of the cable and its gripping members, and cause oxygen to enter and gradually form and set up an oxidized coating. Such coating tends to increase the resistance to proper conductivity of an electric current, resulting in excessive heating, loss of energy, and other objections not necessary to refer to specifically. The serrations of the grooves 32 however not only cause effective gripping of the cable, but also increase the area of contact with the bared wires of the cable.

The pins 28 of one clamp member smoothly fitting holes 27 in the other member, insure correct positioning of the two clamp members not only relatively to each other but also of the serrated grooves relatively to the bared wires of the cable. In other words, when the two members 24, 25, are being closed together to grip the cable, there can be no rocking or tilting of one relatively to the other so as to leave a space between any portion of a groove and some of the cable wires.

By the term cable employed herein, we do not intend to limit ourselves to a conductor of the conventional type illustrated in the accompanying drawings, but intend that said term shall be construed to include any type of conductor for an electric current and which is capable of use in the maner described.

While the metal inserts referred to are illustrated only at 17 and 22, it is to be understood that in practice, when screws are employed for securing the base plate 14 to the bottom of the lower casing member 12, as indicated by dotted lines in Figure 2, it is preferable to provide the bottom of said casing member with similar inserts for such screws.

The most important features of our invention reside in the clamp members 24, 25, and the housings therefor, said clamp members serving as a cable support or cable anchor, without requiring for such purpose the members which are illustrated as enclosed in the cap or cover member 44. Therefore, it is to be understood that for such purposes as clamping in position or supporting, any electrical conductors or cables in horizontal or vertical installation, the stud 35 and all of the members which are connected thereto or cooperate therewith, and also the cap 44, may be eliminated, and in place thereof a plain plate or other preferred shape of cap may be substituted for the hollow cap 44. If the conductor to be gripped is a bar or rod that is flat or of a shape other than round, then the shapes of the grooves 32 will be such as to correspond therewith.

The structure as so far described and as illustrated in Figures 1 to 10, relates to the assembly for anchoring and connecting one main cable and arranging for one or more bus bars or taps B. We will now describe a structure of the same general type but developed for use or adoption in a field of wider application, the same being illustrated in Figures 11 to 16 and showing the development for supporting, connecting, and tapping a plurality of two or more main cables A with one or more tap cables B.

Preliminarily it is desirable to explain that in electrical constructions which require the connection of main cables or electrical conductors in various locations between the terminating ends of cables or conductors as well as at the ends thereof, it is necessary, in general practice, to use bus bars, cables, soldered or mechanical joints which are not only expensive but inefficient, and that can only be installed at high cost, and necessitate structural changes due to limitation of space. In addition to such rather complex installation, and the labor required to effect the same, it is necessary to provide other material or devices, and perform other operations, in order to provide the proper supporting or anchoring of the cables or conductors. With such structures as illustrated in Figures 11 to 16, all connections are not only capable of being accomplished in practically the same time, and requiring no greater area, than would be required for connecting and supporting a single cable or electrical conductor.

The support and connecter which will now be described is practically the same as the structure illustrated in Figures 2 and 3 so far as the lower and upper members are concerned. The difference is best illustrated by comparing Figures 14 and 15 with Figures 2 and 3, said difference consisting in interposing additional cable-gripping members between the lower members 12, 13, and the cap member 44 with its enclosed members. In other words, the cap 44 and all members enclosed therein or carried thereby are separated or removed from the positions shown in Figures 2 and 3, the interposed members presently described are then mounted on the upper insulating member 13, and the cap 44 and its contained members are then returned to position but above and mounted on said interposed members. For holding all members together, the screws 18 are, of course, longer than required when such interposed members are absent as in Figures 2 and 3.

As best illustrated by Figures 4 and 5, the interposed members are practically duplicates of the members below them, and for this reason bear the same reference numerals with the addition of the exponent "a". Consequently it will readily be understood that in Figures 11 to 16 the parts or members having numeral indices alone are substantially the same as the similarly indicated members in Figures 1 to 10, while those members having indices including the exponent "a" are the members added to, or interposed in, the structure shown in Figures 1 to 10.

It has been explained, in connection with Figures 1 to 10, that the cover member 44 may be mounted so that the bus bar connection may extend in either one of four directions. The same is true of the structure shown in Figures 11 to 16 which enables the intermediate members to be mounted in differently turned positions. As illustrated in Figures 11, 13, 14 and 15, the lower and upper cables may be gripped while extending at a right angle to each other, while the structure which permits the intermediate members to be mounted in differently turned positions, enables the lower and upper cables to be gripped while extending parallel with each other as illustrated in Figure 12. The said figures illustrate how the main cables may be run parallel or at right angles to each other, the one device accomplishing the electrical connection and the mechanical support of a plurality of main cables, and also providing for tapping or bleeding connections.

From the foregoing, it will be understood that a single complete support and connector may, according to the requirements of the work to be done, be quickly converted from such condition as illustrated in Figures 14 and 15, to such condition as illustrated in Figures 2, 3 and 6, or vice versa, the only alteration required being the employment of longer or shorter connecting screws 18, according to whether the intermediate members 12ª, 13ª, 24ª and 25ª, are included or removed.

Figure 16 illustrates that the insulated gripping members may be made wider and provide a structure for mounting a plurality of cables side by side.

It is important that the conductor-gripping members shall be so mounted as to present or offer no obstruction to their movement freely in all directions to a sufficient extent to avoid risk of interrupting the proper circuit caused by vibrations of the building in which they are installed, or due to other causes. To attain this, the gripping members are not only mounted so they can swing or turn on their axis, which would be the center of the stud 35, but can also rock or tilt in the chamber provided for the gripping members in the insulating casing. This freedom to rock or tilt, to permit the gripping members to move in all directions, is facilitated by the fact that the chamber in the casing is larger in all directions than the size of the gripping members as shown in Figures 2, 3, 4, 6, 14 and 15. And since the walls of the openings leading from the chamber out through the completely enclosing chamber diverge in all directions, said walls offer no obstruction to a corresponding freedom of movement of those portions of the conductor which are surrounded by said walls.

Having now described our invention, we claim:

1. A combined mechanical support and electrical connection engaging a bare conductor at one point of the latter, the means providing for the electrical connection being entirely independent of the mechanical support, the supporting members which engage the conductor being provided with means to permit universal angular adjustment of the conductor at the point of support.

2. A combined mechanical support and electrical connection engaging a bare conductor at one point of the latter, the means providing for the electrical connection being entirely independent of the mechanical support, the members which engage the conductor being mounted to enable them to swing, and an insulating casing completely enclosing the conductor-engaging members, said casing being provided with diverging openings to permit the conductor to swing with its engaging members.

3. The combination with an electric conductor, of a support therefor comprising gripping members contacting with a mid-end bare portion of the conductor, and an insulating casing enclosing the gripping members in an insulated position, said gripping members being free to swing, and the casing having diverging openings for the conductor.

4. The combination with an electric conductor, of a support therefor comprising gripping members contacting with a mid-end bare portion of the conductor, and an insulating casing enclosing the gripping members in an insulated position, said gripping members being free to swing, the casing having diverging openings for the conductor, the chamber in the casing being larger in all directions than the size of the said gripping members to permit the latter to move freely in all directions.

5. Means for maintaining an electrical conductor in operative position, comprising metallic members each having a transverse serrated groove shaped to engage and grip mid-end surfaces of a bare conductor, and insulating material enclosing the gripping members, the said gripping members being mounted to enable them to swing relatively to the insulating material.

6. Means for maintaining an electrical conductor in operative position, comprising metallic members shaped to engage and grip opposite mid-end surfaces of a bare conductor, insulating material enclosing the gripping members, and a bus bar connection member having circuit connections with the conductor-gripping members.

7. Means for maintaining an electrical conductor in operative position, comprising metallic members shaped to engage and grip opposite mid-end surfaces of a bare conductor, insulating material enclosing the gripping members, a bus bar connection member having circuit connections with the conductor-gripping members, and a protector enclosing said bus bar connection member.

8. Means for maintaining an electrical conductor in operative position, comprising metallic members shaped to engage and grip opposite mid-end surfaces of a bare conductor, insulating material enclosing the gripping members, one of said members having a stud, a metal washer fitted over said stud, a bus bar connection member mounted next to said washer, and means for securing the bas bar connection and the washer in close contact.

9. Means for maintaining an electrical conductor in operative position, comprising metallic members shaped to engage and grip opposite mid-end surfaces of a bare conductor, a casing consisting of lower and upper members of insulating material enclosing the gripping members, a cover for the upper casing member, internally threaded metal inserts in the upper surface of each casing member, and screws mounted in the said cover and in the upper casing member and coacting with said inserts to hold the cover and the casing members together.

10. Means for maintaining an electrical conductor in operative position, comprising metallic members shaped to engage and grip opposite mid-end surfaces of a bare conductor, insulating material enclosing the gripping members, a cover for said members, a bus bar connection enclosed in said cover, and means whereby said cover may be secured when turned to either one of four different directions.

11. Means for maintaining an electrical conductor in operative position, comprising metallic members shaped to engage and grip opposite mid-end surfaces of a bare conductor, insulating material enclosing the gripping members, a cover for said members, a bus bar connection enclosed in said cover, four screw-receiving inserts in the top of the casing, and two screws mounted in said cover to engage either two of the inserts in the casing whereby said cover may be secured when turned to either one of four different positions.

12. An electric conductor support comprising a plurality of pairs of conductor gripping members mounted one upon another, said members being shaped to engage and grip opposite mid-end bare surfaces of the conductors, all of said gripping members being enclosed in insulating material.

13. An electric conductor support comprising upper and lower pairs of conductor-gripping members mounted one upon another, the members of each pair being shaped to engage and grip opposite mid-end bare surfaces of the conductors, and means for connecting said pairs to hold the conductors in either one of a plurality of relative positions.

14. An electric conductor support comprising a plurality of individual separably connected casings, individual conductor-gripping members enclosed in said casings, the said members being shaped to engage and grip opposite mid-end bare surfaces of the conductors, a cover for said casings, a bus bar connection enclosed in said cover, and means whereby the individual casings and the gripping members enclosed therein may be secured when turned to either one of a plurality of directions.

15. A support for a plurality of electric conductors, comprising gripping members for each of the conductors, said members being shaped to engage and grip opposite mid-end bare surfaces of the conductors, all of the gripping members being enclosed in insulating material, said gripping members being mounted to permit the individual conductors to run in the same directions or at an angle to each other.

ALFRED J. HIXON.
JOHN W. HOOLEY.